J. Stufflebeen,
Tenoning Machine,
N° 42,886.   Patented May 24, 1864.
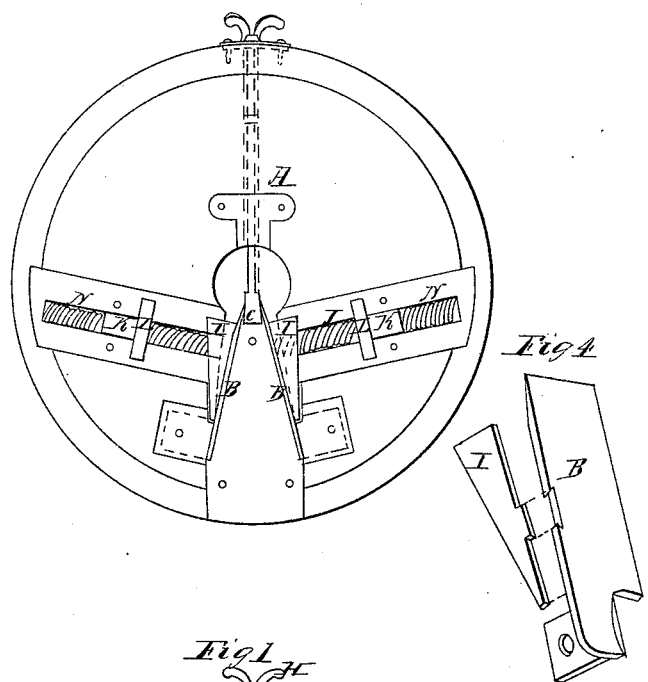
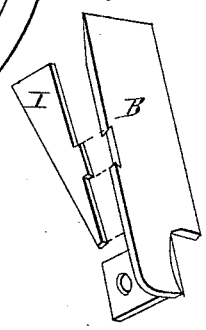
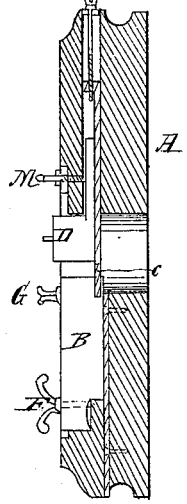
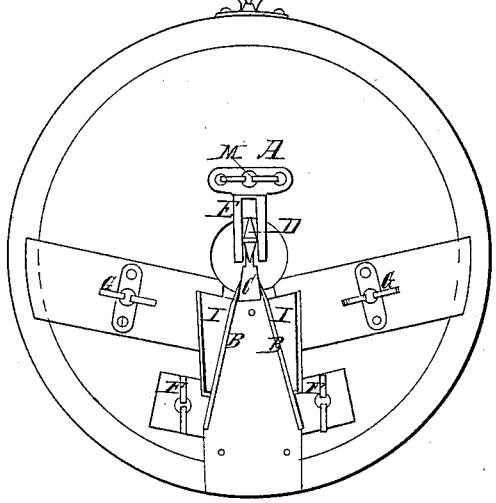
Witnesses  
Alexander Pauls  
Geo. Smith
Inventor,  
James Stufflebeen

UNITED STATES PATENT OFFICE.

JAMES STUFFLEBEEN, OF MILWAUKEE, WISCONSIN.

IMPROVEMENT IN CHAMFERING-MACHINES.

Specification forming part of Letters Patent No. 42,886, dated May 24, 1864.

*To all whom it may concern:*

Be it known that I, JAMES STUFFLEBEEN, of Milwaukee, in the county of Milwaukee and State of Wisconsin, have invented a new and Improved Chamfering-Machine for Chamfering the Ends of Sash-Bars or any Similar Work; and I do hereby declare that the following is a full, clear, and exact description of the construction and operation of the same, reference being had to the annexed drawings, making a part of this specification, in which—

Figure 1 is a view of the chamferer when fully adjusted for operation; Fig. 2, a view with the interior mechanism exposed to sight; Fig. 3, a transverse section, and Fig. 4 one of the chamfering knives with the wing I detached.

Similar letters of reference in the several figures indicate corresponding parts.

The nature of my invention consists in a novel arrangement of mechanism so as to constitute a complete chamferer to chamfer the ends of sash-bars, so that they may be driven into the rails with facility, or for chamfering any similar work.

To enable others skilled in the art to make and use my invention, I will proceed to describe its construction and operation.

A is the bed-piece, of wood or any suitable material; B B, the chamfering-knives; C, the spreader to keep the cutting ends of the knives B B the requisite distance apart, and is regulated by the thumb-screw H; D, knife to split the end of the sash-bar for wedging; E, a stop to prevent the sash-bar from being forced too far through between the chamfering-knives, and the length of the chamfer is regulated thereby; F F, thumb-screws which hold the knives B B in place, and on which the knives swing; G G, set-screws to hold the stops K K in any required position; H, thumb-screw to force out or draw back the spreader C; I I, wings attached to the chamfering knives to prevent dirt and chips from falling behind to clog their opening; J J, spiral springs to force the knives B B toward each other and against the spreader C; K K, stops, the round part of which is in the fixed nuts L L, and the springs J J, to regulate the distance which the ends of the chamfering-knives can be forced apart; L L, fixed nuts or stops which the springs J J butt against; M, thumb set-screw to hold the splitting knife D in any position by being screwed down onto its shank; N N, spiral springs to push the stops K K toward the knives.

Operation: The chamferer being adjusted by the spreader D being drawn back by the set-screw H, or pushed forward so that the knives B B, resting against it, will be the requisite distance apart to make the proper chamfer. The splitting-knife D, fixed to project beyond the stop E, so as to split the sash-bar to the requisite depth for wedging. The stops K K, adjusted by the chamfering-knives being thrown back the full distance of the thickness of the stuff to be chamfered, and then held in place by the set-screws G G. This is done so that, should one of the springs J J be weaker than the other, the chamfering-knife held by it cannot be forced back any farther than half the distance necessary to let the end of the stuff to be chamfered through. In this way the stuff will be chamfered even. This adjustment being made, the sash-bar is taken in the hands and one end of it thrust between the knives B B, which spreads them apart, they swinging on the screws F F far enough apart to let the stuff through when it comes in contact with the splitting knife D, which enters it till it strikes the stop E. It is then withdrawn. The knives B B, beveled on the outside like a chisel, being forced inward by the springs J J, enter the wood on each side, and tapers it down or chamfers it as required. When stuff is to be chamfered, the end of which it is not necessary to split, the splitting-knife D is drawn back so that its edge will not project beyond the stop E.

What I claim as my invention, and desire to secure by Letters Patent, is—

1. The yielding knives B B as arranged, substantially as and for the purpose described.

2. The splitting-knife D, in combination with the knives B B, substantially as and for the purpose described.

3. The adjustable spreader C, in combination with the knives B B, substantially as and for the purpose described.

JAMES STUFFLEBEEN.

Witnesses:
ALEXANDER PAUL,
J. B. SMITH.